US008416889B2

United States Patent
Dell'Amico et al.

(10) Patent No.: US 8,416,889 B2
(45) Date of Patent: Apr. 9, 2013

(54) METHOD OF ESTIMATING TRANSMISSION CHANNEL RESPONSE AND DIFFERENCE OF SYNCHRONIZATION OFFSETS INTRODUCED IN A RECEIVED STREAM OF PACKETS OF OFDM DATA AND RELATIVE RECEIVER

(75) Inventors: Gabriele Dell'Amico, Charvensod (IT); Eleonora Guerrini, Aosta (IT)

(73) Assignee: Dora S.p.A., Aosta (IT)

( * ) Notice: Subject to any disclaimer, the term of this patent is extended or adjusted under 35 U.S.C. 154(b) by 344 days.

(21) Appl. No.: 12/953,874

(22) Filed: Nov. 24, 2010

(65) Prior Publication Data
US 2011/0135022 A1 Jun. 9, 2011

(30) Foreign Application Priority Data
Nov. 27, 2009 (IT) .................... VA09A0075

(51) Int. Cl.
*H04L 27/06* (2006.01)
(52) U.S. Cl.
USPC ........... 375/340; 375/260; 375/259; 375/316; 375/267; 375/295; 375/324; 375/299
(58) Field of Classification Search .................. 375/260, 375/259, 316, 267, 295, 324, 299
See application file for complete search history.

(56) References Cited

U.S. PATENT DOCUMENTS

| | | | | |
|---|---|---|---|---|
| 6,628,738 B1 * | 9/2003 | Peeters et al. | .................. | 375/371 |
| 7,139,320 B1 * | 11/2006 | Singh et al. | .................... | 375/260 |
| 7,203,245 B1 * | 4/2007 | Murphy | ........................ | 375/260 |
| 7,627,049 B2 * | 12/2009 | Kim | ............................... | 375/260 |
| 7,706,437 B2 * | 4/2010 | Saed | ............................. | 375/229 |
| 7,813,442 B2 * | 10/2010 | Gaikwad | ........................ | 375/267 |
| 7,986,736 B2 * | 7/2011 | Nguyen et al. | ................ | 375/260 |
| 2005/0063480 A1 * | 3/2005 | Sang et al. | ..................... | 375/260 |
| 2006/0176802 A1 * | 8/2006 | Ko et al. | ........................ | 370/208 |
| 2007/0230396 A1 | 10/2007 | Watanabe | ..................... | 370/329 |

OTHER PUBLICATIONS

Fu et al.: "Improved ODFM Channel Estimation using Inter-Packet Information" Signals, Systems and Computers, 2005. Conference Record of the Thirty-Ninth Asilomar Conference on, Pacific Grove, California Oct. 28-Nov. 1, 2005 IEEE.
Sliskovic M: "Sampling frequency offset estimation and correction in OFDM systems" Electronics, Circuits and Systems, 2001. ICECS 2001. The $8^{th}$ IEEE International Conference on Sep. 2-5, 2001, Piscataway, NJ, USA, IEEE.
Riva et al.: "Improved HomePlug AV channel estimation exploiting sounding procedure", Power Line Communications and Its Application, ISPLC 2009, IEEE International Symposium on, IEEE, Mar. 2009, pp. 296-300.

* cited by examiner

*Primary Examiner* — Kenneth Lam
(74) *Attorney, Agent, or Firm* — Allen, Dyer, Doppelt, Milbrath & Gilchrist, P.A.

(57) ABSTRACT

An OFDM receiver includes a sampling circuit configured to sample an incoming signal received through a transmission channel and an estimation circuit configured to receive samples of the incoming signal and to estimate transmission channel response and eventual differences of synchronization offsets introduced at a receiver side. An equalizer may be coupled to the estimation circuit and configured to compensate an effect of the transmission channel response and of the differences of synchronization offsets on the received samples and to generate equalized samples. An OFDM detector may be configured to generate a stream of demodulated digital symbols based upon the equalized samples.

23 Claims, 4 Drawing Sheets

METHOD OF ESTIMATING TRANSMISSION CHANNEL RESPONSE AND DIFFERENCE OF SYNCHRONIZATION OFFSETS INTRODUCED IN A RECEIVED STREAM OF PACKETS OF OFDM DATA AND RELATIVE RECEIVER

FIELD OF THE INVENTION

This invention relates to digital communications and, more particularly, to a method of estimating transmission channel response and difference of synchronization offsets introduced in a received stream of packets of OFDM data and a relative receiver of OFDM digital symbols.

BACKGROUND OF THE INVENTION

High-speed communication systems use a relatively large bandwidth to obtain data rates up to hundreds of mega bits per second. With reference to wireless and power-line systems, in such bandwidths the frequency selective nature of the channel may limit the overall system performance.

A robust modulation against the frequency-selectivity of the channel is orthogonal frequency division multiplexing (OFDM), which transforms a frequency selective channel into a set of parallel flat sub-channels. In this context, the so-called channel estimation, i.e. the estimation of functioning parameters of the transmission channel, is a crucial element to demodulate the received data. Considering packet communications, a known header is transmitted at the beginning of each packet and may be used to carry out data-aided channel estimations. The accuracy of this estimation depends on the number of symbols of the header, which is generally small to reduce the overhead of the packet.

Assuming the channel time-invariant during the transmission of several packets, a method to improve channel estimation may be to average out the estimates performed during previous packets. The phase of the estimated channel linearly depends on both the frame synchronization point and the phase of the sampling clock, hence it may be different from packet to packet. This implies that the channel estimations should not be simply averaged out, but, in order to have a reliable estimation, linear phase differences may be estimated and compensated.

This issue has been previously tackled in "Improved HomePlug AV channel estimation exploiting sounding procedure," Riva, M. Odoni, E. Guerrini and P. Bisaglia, *IEEE ISPLC* 2009, pp. 296-300, 2009 and in "Improved OFDM channel estimation using inter-packet information," D. Fu, *IEEE ACSSC* 2005, pp. 514-518, October 2005. Unfortunately, the technique disclosed in Riva at al. performs well when the phase of the sampling clock does not change from packet to packet, and the technique disclosed in Fu works well at high signal-to-noise ratio (SNR).

SUMMARY OF THE INVENTION

To overcome the above-mentioned drawbacks, a Maximum-Likelihood (ML) estimation technique is proposed, which works in the frequency domain. It may be difficult to calculate analytically the time value that addresses the ML drawbacks, and a numerical approach might be too onerous to be implemented in a real-time demodulation.

An algorithm is proposed in order to significantly reduce the computational load without a sensible accuracy loss. The algorithm may be subdivided in two steps: first, a coarse estimation of the difference of the synchronization offset is obtained, then a refined estimation is calculated by processing values in a neighborhood of the coarse estimation.

According to an embodiment, this refined approximation is obtained with a search algorithm. According to another embodiment, this refined approximation is obtained with a quadratic Taylor's series approximation about the coarse estimation.

The algorithm may be applied in OFDM systems and may be implemented through hardware, or through software code executed by a processor. A OFDM receiver implementing the method is also proposed.

DETAILED DESCRIPTION OF THE PREFERRED EMBODIMENTS

In order to better understand the field of the novel method, a brief review of OFDM is presented. The mathematical analysis of the method will be carried out based upon the hypothesis that the phase carrier offset and the frequency carrier offset are null. This condition is rigorously verified in base-band communications and is practically verified in a receiver that has dedicated circuits for compensating carrier offsets.

These dedicated circuits are well known in the practice and commonly used in receivers that need them. For this reason, it may be fairly assumed in the ensuing description that carrier offsets are negligible.

In communication systems in which this hypothesis is not verified, the method is still usable, though performances may be worse than those illustrated in this description and may depend on the amplitude of carrier offsets.

In OFDM-based packet communication systems, the data symbols are serial-to-parallel converted into N streams and fed into the OFDM modulator implemented by using a N-point inverse discrete Fourier transform (IDFT). Successively, a Cyclic Prefix (CP) is added at the beginning of each OFDM symbol to mitigate inter-symbol and inter-carrier interference (ISI and ICI). At the receiver, the signal is sampled and the samples sent to a frame synchronization block. After the CP removal, OFDM demodulation is performed by means of a N-point discrete Fourier transform (DFT). Through this work the following assumptions are made: the channel is time-invariant within several packets, and a small sampling frequency offset between the transmitter and the receiver clocks is present.

However, even a small sampling frequency offset between the transmitter and the receiver clocks leads to a Sampling Phase Offset (SPO), which is different from packet to packet. Hereinafter $\Delta_n^{SPO}$ designates the SPO between the transmitter and the receiver clocks during the n-th packet. With respect to the frame synchronization block, in the absence of noise, it is expected to estimate the same synchronization point in each packet.

Unfortunately, due to the noise, the estimate of the beginning of the packet may differ from the expected synchronization point and a Frame Synchronization Offset (FSO) occurs. Hereinafter $\Delta_n^{FSO}$ designates the FSO occurred during the n-th packet.

Let H(k) be the channel frequency response complex coefficient over the k-th sub-carrier. Let $X_{n,s}(k)$ and $W_{n,s}(k)$ be the frequency domain transmitted symbol and the additive noise, eventually comprising the residual ISI and ICI, respectively, over the k-th sub-carrier for the s-th OFDM symbol during the n-th packet. The received sample at the DFT output is $$Y_{n,s}(k) = H(k)e^{i\frac{2\pi k}{N}\Delta_n}X_{n,s}(k) + W_{n,s}(k) \tag{1}$$

where $$\Delta_n = \Delta_n^{SPO} + \Delta_n^{FSO} \tag{2}$$

is the synchronization offset, N is the number of points of the discrete Fourier transform, $\Delta_n^{SPO}$ is a fraction of the sampling time, $\Delta_n^{FSO}$ is an integer multiple, positive or negative, of the sampling time, and both may be different from packet to packet. The estimated transmitted sample, here denoted as $\hat{X}_{n,s}(k)$, is obtained using a one-tap equalizer as follows $$\hat{X}_{n,s}(k) = \frac{Y_{n,s}(k)}{H(k)e^{i\frac{2\pi k}{N}\Delta_n}} \tag{3}$$

It should be understood that the term $$H(k)e^{i\frac{2\pi k}{N}\Delta_n}$$

is not known at the receiver, but it has to be estimated.

A data-aided channel estimation may be performed during the current packet by exploiting the known symbols within the header. Using a LS (Least Square) estimator, as discussed in, "On channel estimation in OFDM systems," *IEEE VTC* 1995, pp. 815-819, July 1995, J.-J van de Beek, O. Edfors, M. Sandell, S. K. Wilson and P. O. Borjesson, over S symbols of the header, the channel estimation performed over the k-th sub-carrier during the n-th packet is $$\hat{H}_n(k) = \frac{1}{S}\sum_{s=1}^{S}\frac{Y_{n,s}(k)}{X_{n,s}(k)} \tag{4}$$

Substituting (1) into (4), the estimate $\hat{H}_n(k)$ is $$\hat{H}_n(k) = H(k)e^{i\frac{2\pi k}{N}\Delta_n} + N_n(k) \tag{5}$$

where $$N_n(k) = \frac{1}{S}\sum_{s=1}^{S}\frac{W_{n,s}(k)}{X_{n,s}(k)} \tag{6}$$

is the noise with variance $\sigma_N^2(k)$.

The accuracy of the channel estimation available during the p-th packet may be improved by averaging out the channel estimates (5) collected up to the p-th packet taking into account that the differences among the synchronization offsets of different packets may be known. Let $\tau_{p,n}$ be the difference between the synchronization offset of the p-th and n-th packets, defined as $$\tau_{p,n} = \Delta_p - \Delta_n. \tag{7}$$

The averaged channel estimation performed over the k-th sub-carrier during the p-th packet is $$\overline{H}_p(k) = \frac{1}{p}\sum_{n=1}^{p}\hat{H}_n(k)e^{i\frac{2\pi k}{N}\tau_{p,n}} \tag{8}$$

Substituting (5) into (8), the estimate $\overline{H}_p(k)$ is $$\overline{H}_p(k) = H(k)e^{i\frac{2\pi k}{N}\Delta_p} + \overline{N}_p(k) \tag{9}$$

where $$\overline{N}_p(k) = \frac{1}{p}\sum_{n=1}^{p}N_n(k)e^{i\frac{2\pi k}{N}\tau_{p,n}} \tag{10}$$

is the noise with variance $\sigma_{\overline{N}_p}^2(k) = \sigma_N^2(k)/p$. In order to reduce the computational effort, equation (8) may be rewritten in the following recursive form $$\overline{H}_p(k) = \begin{cases} \hat{H}_1(k), & p = 1 \\ \dfrac{\hat{H}_p(k) + (p-1)\overline{H}_{p-1}(k)e^{i\frac{2\pi k}{N}\tau_{p,p-1}}}{p}, & p > 1 \end{cases} \tag{11}$$

where the estimate performed during the p-th packet, $\hat{H}_p(k)$, is used to update the estimate accumulated during the p−1 previous packets, $\overline{H}_{p-1}(k)$.

In order to properly add $\hat{H}_p(k)$ to $\overline{H}_{p-1}(k)$ in (11), $\tau_{p,p-1}$ may be estimated. To this aim, the ML (Maximum Likelihood) estimator is proposed. From (5) and (9), it is possible to relate $\tau_{p,p-1}$ with $\hat{H}_p(k)$ and $\overline{H}_{p-1}(k)$ as follows:

$$\hat{H}_p(k) = \overline{H}_{p-1}(k)e^{i\frac{2\pi k}{N}\tau_{p,p-1}} + N'_p(k) \tag{12}$$

where $$N'_p(k) = N_p(k) - \overline{N}_{p-1}(k)e^{i\frac{2\pi k}{N}\tau_{p,p-1}} \tag{13}$$

is the noise with variance $\sigma_{N'}^2(k) = \sigma_N^2(k) + \sigma_N^2(k)/(p-1)$. Starting from (12) and assuming $N'_p(k)$ to be Gaussian noise with zero mean, the ML estimator, as discussed in S. M. Kay,

*Fundamentals of Statistical Processing, Volume I: Estimation Theory.* Prentice Hall, 1993, of $\tau_{p,p-1}$ is $$\hat{\tau}_{p,p-1} = \underset{\tilde{\tau}\in\Gamma}{\operatorname{argmin}} \sum_{k\in\Psi} \frac{1}{\sigma_{N'_p}^2(k)} d(\tilde{\tau}, k) \quad (14)$$

where $\Gamma$ is the set of values that $\tau_{p,p-1}$ may assume, $\Psi$ is a sub-set of the sub-carriers used in the OFDM system and $$d(\tilde{\tau}, k) = \left| \hat{H}_p(k) - \overline{H}_{p-1}(k) e^{i\frac{2\pi k}{N}\tilde{\tau}} \right|^2 \quad (15)$$

is the square of the Euclidean distance between $\hat{H}_p(k)$ and $$\overline{H}_{p-1}(k) e^{i\frac{2\pi k}{N}\tilde{\tau}}.$$

The ML estimator may be intuitively explained as follows: considering the Gauss plane, if $\tilde{\tau}$ changes the vector $$\overline{H}_{p-1}(k) e^{i\frac{2\pi k}{N}\tilde{\tau}}$$

rotates and the Euclidean distance $d(\tilde{\tau},k)$ changes. $d(\tilde{\tau},k)$ is minimum when the vectors $\hat{H}_p(k)$ and $$\overline{H}_{p-1}(k) e^{i\frac{2\pi k}{N}\tilde{\tau}}$$

and overlap. In the absence of noise, the estimate $\hat{\tau}_{p,p-1}$ is the value of $\tilde{\tau}$ that simultaneously minimizes $d(\tilde{\tau},k)$ for each k in $\Psi$. The sum in (14) is a periodic function with period N, hence the estimator may not discriminate between $\tau_{p,p-1}$ and $\tau_{p,p-1}$+ lN, with/integer. Supposing that the frame synchronization algorithm properly works, it is reasonable to assume that $\tau_{p,p-1}$ lies in $\Gamma=[-N/2,N/2)$.

A drawback of the ML estimator is its computational complexity. However, after some manipulations, (14) may be simplified as $$\hat{\tau}_{p,p-1} = \underset{\tilde{\tau}\in\Gamma}{\operatorname{argmax}} F(\tilde{\tau}) \quad (16)$$

where $$F(\tilde{\tau}) = \sum_{k\in\Psi} f(\tilde{\tau}, k) \quad (17)$$

and $$f(\tilde{\tau}, k) = A_p(k)\cos\left(\frac{2\pi k}{N}\tilde{\tau}\right) + B_p(k)\sin\left(\frac{2\pi k}{N}\tilde{\tau}\right) \quad (18)$$

with $$A_p(k) = \frac{1}{\sigma_{N'_p}^2(k)} \{ \Re[\hat{H}_p(k)]\Re[\overline{H}_{p-1}(k)] + \Im[\hat{H}_p(k)]\Im[\overline{H}_{p-1}(k)] \} \quad (19)$$

and $$B_p(k) = \frac{1}{\sigma_{N'_p}^2(k)} \{ \Im[\hat{H}_p(k)]\Re[\overline{H}_{p-1}(k)] - \Re[\hat{H}_p(k)]\Im[\overline{H}_{p-1}(k)] \} \quad (20)$$

wherein $\Re[.]$ and $\Im[.]$ are the real part and the imaginary part of their argument, respectively.

Figure 1:
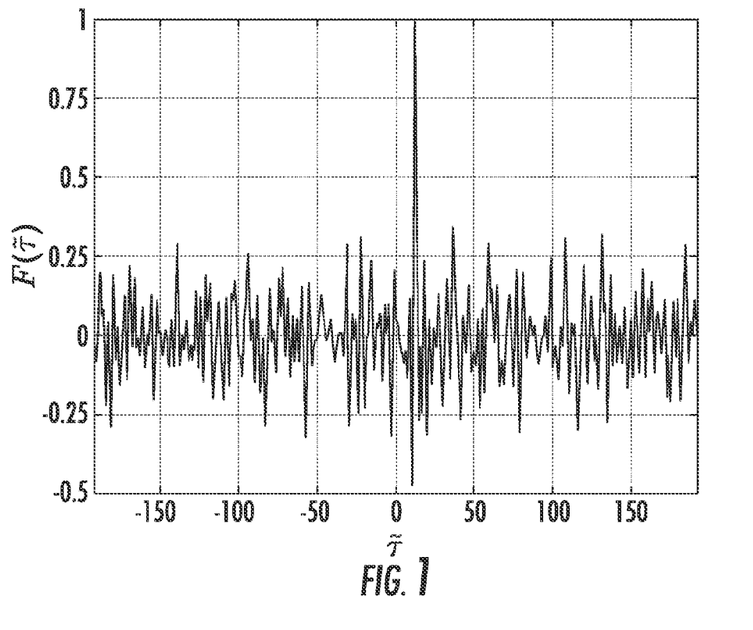
FIG. 1 is an exemplary graph of the function $F(\tilde{\tau})$ for $\tau_{p,p-1}=12.5$ at SNR=5 dB of the received signal, in accordance with the present invention.

FIG. 1 shows a realization of $F(\tilde{\tau})$ for $\tau_{p,p-1}$=12.5 and N=384, with an additive white Gaussian noise (AWGN) at a signal-to-noise ratio (SNR), defined hereinafter, equal to 5 dB.

Although the shape of $F(\tilde{\tau})$ depends on the channel, on the noise and on the value of $\tau_{p,p-1}$, in the range $\Gamma$ the function $F(\tilde{\tau})$ presents one absolute maximum, which corresponds to $\hat{\tau}_{p,p-1}$ and several local maxima. The value of $\tilde{\tau}$ that maximizes $F(\tilde{\tau})$ may not be found analytically. Moreover, a maximum search algorithm may be useless in the whole range $\Gamma$ because of the presence of several local maxima.

This value may be found by iteratively calculating $F(\tilde{\tau})$ for discrete values of $\tilde{\tau}$. Let U be the cardinality of $\Psi$ and let T be the number of discrete values of $\tilde{\tau}$ (iterations) for which $F(\tilde{\tau})$ is calculated. The computational complexity in terms of U and T is reported in Table 1. The computational load related to the evaluation of the $2\pi k/N$ terms is not considered in the computational complexity, since these terms are considered constants for a given OFDM system. The accuracy of the estimate depends on the resolution of the discrete values of $\tilde{\tau}$, which increases with T.

TABLE 1

| Computational complexity of the ML estimator by iterative search. | |
| --- | --- |
| Cosine & Sine | 2UT |
| Additions | 2U + (2U − 1)T |
| Multiplications | 6U + 3UT |
| Divisions | U |

The above calculations are relatively onerous to be executed in a receiver. The complexity of the estimator (16) is reduced by:

i) finding a coarse estimate of $\tau_{p,p-1}$, hereafter referred as $\tau_{p,p-1}'$;

ii) improving the coarse estimate to find an accurate estimate of $\tau_{p,p-1}$, hereafter referred as $\overline{\tau}_{p,p-1}$.

Figure 2:
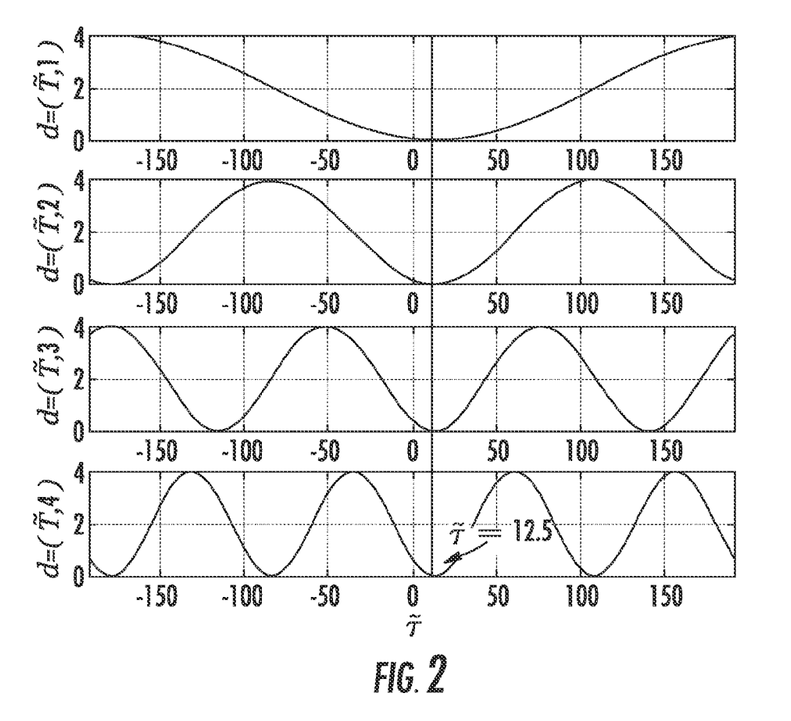
FIG. 2 are exemplary graphs of the function $d(\tilde{\tau},k)$ for sub-carriers 1, 2, 3 and 4 with $\tau_{p,p-1}=12.5$ in the absence of noise, in accordance with the present invention.

Regarding the first step, let $\alpha_{p,p-1}(k)\epsilon[-\pi,\pi)$ be the phase difference between $\hat{H}_p(k)$ and $\overline{H}_{p-1}(k)$. The distance function $d(\tilde{\tau},k)$, defined in Equation (15), is minimized when $\hat{H}_p(k)$ and $$\overline{H}_{p-1}(k) e^{i\frac{2\pi k}{N}\tilde{\tau}}$$

overlap, that is when $$\frac{2\pi k}{N}\tilde{\tau} = \alpha_{p,p-1}(k) + 2\pi l \quad (21)$$

being l an integer. Considering the k-th sub-carrier, within the range Γ the condition (21) is satisfied for k values of $\tilde{\tau}$, referred as $\tilde{\tau}_l(k)$, and given by $$\tilde{\tau}_l(k) = \frac{N}{2\pi k}\alpha_{p,p-1}(k) + \frac{N}{k}l \quad (22)$$

with l=0, 1, ..., k−1. When $\tilde{\tau}_l(k)$ is greater than N/2, it is remapped in the range Γ by subtracting N. In general, each function $d(\tilde{\tau},k)$ has a minimum at $\tilde{\tau}_l(k)$ with l=0, 1, ..., k−1. However, in the absence of noise, there may be only one $\tilde{\tau}_l(k) = \tau_{p,p-1}$ at which all functions $d(\tilde{\tau},k)$ have a minimum for any sub-carrier k. To clarify this assertion, in FIG. 2 the graphs of the function $d(\tilde{\tau},k)$ are shown for k=1,2,3 and 4, in the absence of noise.

Based on this consideration, a coarse estimate of $\tau_{p,p-1}$ may be obtained by crosschecking all $\tilde{\tau}_l(k)$ for all sub-carriers by means of a histogram.

In particular, the interval Γ has been divided into N/W sub-intervals of width W, called histogram bin size, centered in $\tilde{\tau}_i = Wi$, with $i = -N/2W, \ldots, N/2W$. The coarse estimate $\tau_{p,p-1}'$ is given by the center of the sub-interval where the histogram has its maximum value. If noise is present, no $\tilde{\tau}_l(k)$ exactly matches $\tau_{p,p-1}$, but the density of $\tilde{\tau}_l(k)$ is statistically higher in the sub-interval where $\tau_{p,p-1}$ lies, rather than in other sub-intervals.

Figure 3:
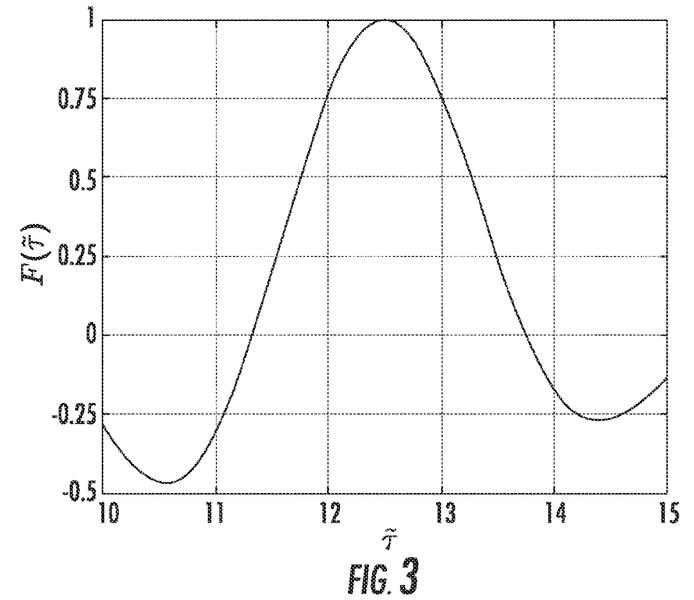
FIG. 3 is a magnified view of the graph of FIG. 1 $F(\tilde{\tau})$ in a neighborhood of $\tau_{p,p-1}=12.5$ in accordance with the present invention.

As regards the second step to improve the coarse estimate, we highlight that a zoom of $F(\tilde{\tau})$ in a neighborhood of $\tau_{p,p-1}$ shows that the curve is concave and that only one maximum is present, as depicted in FIG. 3.

A solution may be to apply a maximum search algorithm in a limited neighborhood of $\tau_{p,p-1}'$, where $F(\tilde{\tau})$ is still concave if the distance between and $\tau_{p,p-1}'$ and $\tau_{p,p-1}$ is small. In this case, the maximum search algorithm may converge to $\tau_{p,p-1}$ in few iterations.

An alternative solution, which further reduces the computational load, is approximating $F(\tilde{\tau})$ by means of the Taylor series of degree 2 about $\tau_{p,p-1}'$ and setting the first derivative of the series equal to zero. The refined estimation is given by $$\overline{\tau}_{p,p-1} = \tau_{p,p-1}' - \frac{\sum_{k\in\Psi} A_p(k)\sin\left(\frac{2\pi k}{N}\tau_{p,p-1}'\right) - B_p(k)\cos\left(\frac{2\pi k}{N}\tau_{p,p-1}'\right)}{\sum_{k\in\Psi} \frac{2\pi k}{N}\left[A_p(k)\cos\left(\frac{2\pi k}{N}\tau_{p,p-1}'\right) + B_p(k)\sin\left(\frac{2\pi k}{N}\tau_{p,p-1}'\right)\right]} \quad (23)$$

The accuracy of (23) depends on the closeness of $\tau_{p,p-1}'$ to $\tau_{p,p-1}$, hence it increases when the histogram bin size W decreases. However, if W is too small, the histogram used to estimate $\tau_{p,p-1}'$, due to the noise, does not properly work and the probability of $\tau_{p,p-1}'$ being far from $\tau_{p,p-1}$ increases. Therefore, a good trade-off to properly choose W has to be found.

According to an embodiment, W is pre-established. According to another embodiment, W is determined heuristically depending on the channel characteristics.

The bin size W may also be determined using a procedure disclosed in detail hereinafter.

Figure 8:
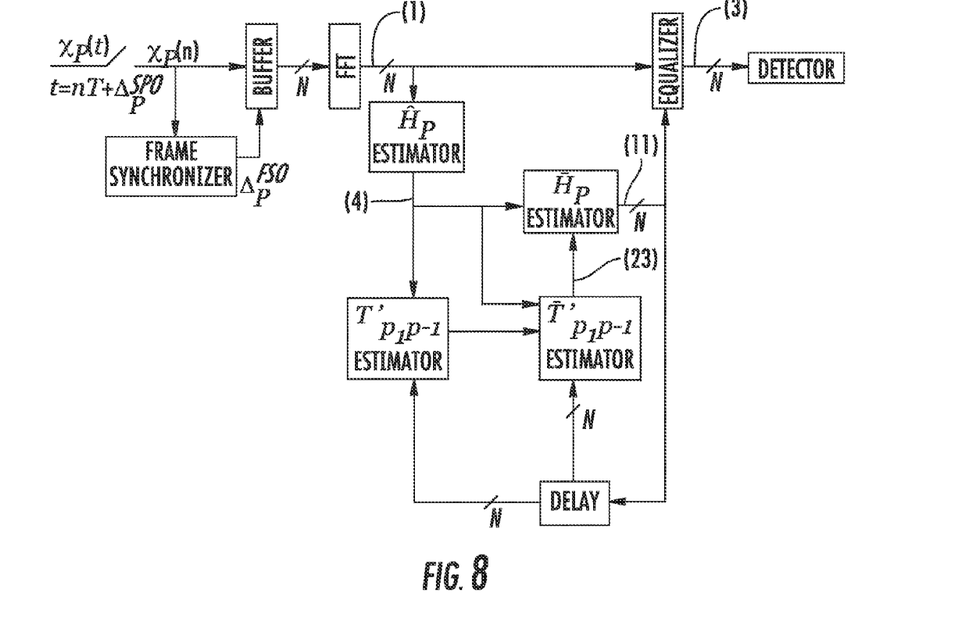
FIG. 8 is a block diagram of a receiver that implements a method in accordance with the present invention.

FIG. 8 depicts a block diagram of a receiver that implements the method. The computational complexity for the search of $\tau_{p,p-1}'$ and the application of (23) are shown in Tables 2 and 3, respectively. Table 2 does not include the computational load of the histogram. This method will be referred to as Taylor series approximation (TS).

TABLE 2

Computational complexity for the search of $\tau_{p,p-1}'$.

| Phase differences | U |
|---|---|
| Additions | $\Sigma_{k\in\Psi}(k-1)$ |
| Multiplications | U |

TABLE 3

Computational complexity of the estimator based on the Taylor series.

| Cosine & Sine | 2U |
|---|---|
| Additions | 2U − 1 |
| Multiplications | 12U |
| Divisions | U + 1 |

To analyze the performance of the proposed algorithm, the HomePlug AV (HPAV) system HomePlug PowerLine Alliance, "HomePlug AV specification," May 2007, version 1.1., "HomePlug AV white paper," http://www.homeplug.org has been chosen, and a power-line environment has been simulated considering the channel models proposed by the open power-line communication European research alliance (OPERA) project "Theoretical postulation of PLC channel model," M. Babic, M. Hagenau, K. Dostert and J. Bausch March 2005. tech. Rep., OPERA. Through numerical results, the estimator based on the Taylor series is compared with the ML estimator, showing nearly the same performance. Moreover, both are shown to achieve the performance of an ideal system where the phase differences among the packets are known at the receiver.

HPAV System and Channel Model

HPAV is a suitable system to analyze the performances of the proposed algorithm since neither phase nor frequency carrier offset is present. Furthermore, HPAV provides a sounding procedure that includes sending consecutive packets known at the receiver to probe the characteristics of the channel before establishing a new connection. To improve the channel estimation, the sounding procedure may be exploited by averaging out the channel estimates performed during the packets of the sounding. This is possible when the differences among the synchronization offsets of different packets are estimated. In a typical HPAV packet, the known symbols of the header are followed by the information data of the payload. During the sounding procedure also the payload is known at the receiver. The channel estimation in (11) is applied both among sounding packets and among sounding and data packets. In particular, during the sounding, (4) is applied to the payload (S=20), while in the data packet (4) may be applied to the header only (S=4). Applicants have observed that, in tests, the sounding procedure exploits 4 packets. The main parameters used in the simulations are resumed in Table 4.

TABLE 4

Parameters used in the simulations.

| HPAV | |
|---|---|
| Modulation order | B-PSK, 1024-QAM |
| Turbo code rate | ½ |
| FFT-points (N) | 3072 |
| Symbols of the header | 4 |
| Symbols of the payload during sounding | 20 |
| Packets of sounding | 4 |

As regards the channel, a power-line environment has been modeled using the channel references for in-house networks proposed by OPERA. The presented results are obtained with the multi-path channel model 1, characterized by 5 paths and the impulse response duration of 0.5 µs. For further details, the interested reader should refer to M. Babic et al. AWGN noise is included.

TS Algorithm Performance

Performance of novel TS algorithm is analyzed in the presence of SPO and FSO changing from packet to packet and for different SNR values, where the SNR is defined as the ratio between the power of the received signal and the power of the noise over the signal bandwidth. To implement the TS algorithm, the following parameters may be defined:

1) the number of sub-carriers used, U;
2) the histogram bin size, W.

If the number of sub-carriers is great, the statistical of the histogram is more accurate and the coarse estimate results more robust to the noise. On the other hand, the complexity of the algorithm increases, as described in Table 2 and Table 3.

In the following simulations, U is set equal to 100, since this value results in a good trade-off between performance and algorithm complexity. As far as the bin size W of the histogram is concerned, an exemplary way of choosing this value according to the channel characteristics is presented herein below. One or more symbols of the header is/are transmitted and the following analysis in an AWGN channel is carried out:

1. Let $\overline{L}$ be a positive real number and let $\tau_{p,p-1}'$ be chosen such that $|\tau_{p,p-1}' - \tau_{p,p-1}| = \overline{L}$. The refined estimations $\overline{\tau}_{p,p-1}$ are calculated for different realizations of noise by means of Equation (23).

2. The mean square error (MSE), defined as $$MSE = E\{|\overline{\tau}_{p,p-1} - \tau_{p,p-1}|^2\} \quad (24)$$

is calculated, where E(x) denotes the expectation of x.

3. Step 1. and 2. are repeated, at the SNRs of interest, for different values of $\overline{L}$.

4. The value L is chosen as the biggest value of $\overline{L}$ that allows reaching a desired MSE.

5. Let the histogram bin size be equal to $\overline{W}$. The value $\tau_{p,p-1}'$ is determined as the value that maximizes the histogram. The probability P, defined as $$P = Pr\{|\tau_{p,p-1}' - \tau_{p,p-1}| < L\} \quad (25)$$

is calculated.

6. Step 5. is repeated for different values of $\overline{W}$.

7. The value W is chosen as the value of $\overline{W}$ that maximizes P.

Figure 4:
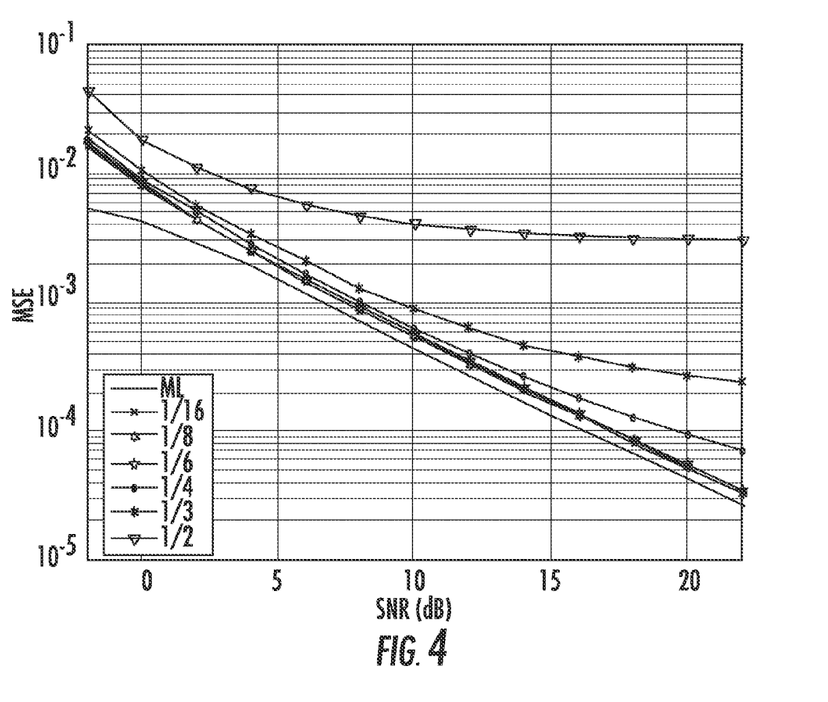
FIG. 4 compares the performances in terms of mean square error MSE vs. SNR of the received signal, for the algorithm TS for different values of W and the maximum likelihood algorithm ML, in accordance with the present invention.
Figure 5:
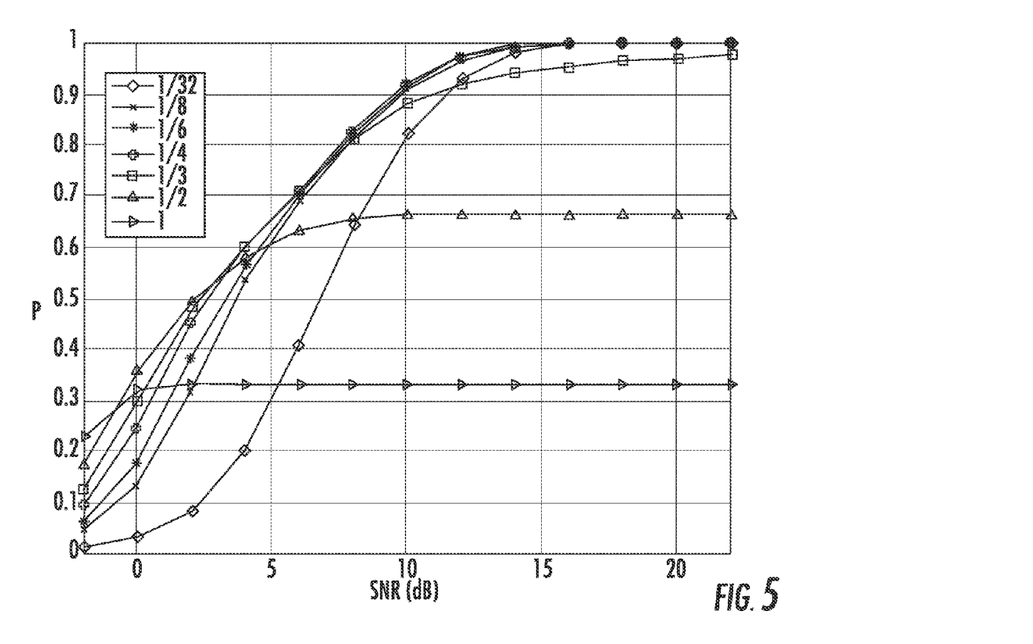
FIG. 5 depicts the probability P that the coarse estimate $\tau'_{p,p-1}$ lies in a limited neighborhood of $\tau_{p,p-1}$ for different values of the width W of the neighborhood as a function of the SNR of the received signal, in accordance with the present invention.

The MSE and the probability P are shown in FIG. 4 and FIG. 5, respectively, over an AWGN channel when only one symbol of the header is used for the channel estimation (S=1). In particular, in FIG. 4 the MSE for different values of $\overline{L}$ from 1/16 to 1/2 is shown. For comparison, the MSE of the ML estimator is also reported. Performance improves as $\overline{L}$ decreases, almost overlapping the ML estimator for $\overline{L} \leq 1/6$, hence L=1/6 is chosen and it is used in the calculus of the probability P. FIG. 5 shows the probability P for different values of $\overline{W}$; initially, P improves as $\overline{W}$ decreases, but the trend of P inverts for the smallest values of $\overline{W}$. From these considerations, the value W=1/4 is adopted for the remaining simulations.

Performances of the TS algorithm, applied to the described system, are analyzed in terms of bit error rate (BER) versus SNR. In order to compare the proposed algorithms to other solutions, the following curves are also reported:

bound: the channel estimation is performed exploiting the packets of the sounding, and the synchronization offset is assumed known at the receiver. This represents the bound that the algorithm may achieve.

sound+header estimation (SHE): the estimate of the channel magnitude is performed exploiting all the packets of the sounding, but the estimate of the phase is performed using the header of the current data packet. Indeed, the magnitudes are not affected by synchronization offsets, thus they may be correctly averaged. On the other hand, estimating the phase over the data packet allows proper absorption of the current synchronization offset.

header estimation (HE): the channel estimation is performed using the header of the current data packet. This is the coarser channel estimation, which does not exploit the sounding at all.

cross-correlation in time domain (XTD): the channel estimation is performed by means of the algorithm based on the time-domain cross-correlation proposed in Riva at al.

Figure 6:
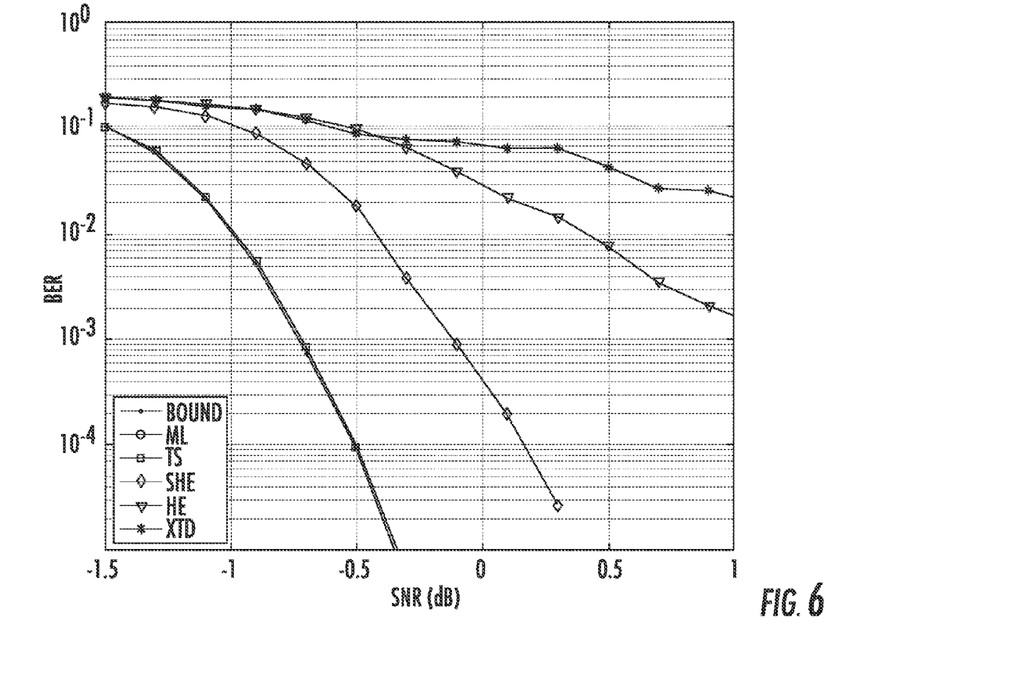
FIG. 6 compares the BER performances vs. SNR for a B-PSK modulation using the ML algorithm, the algorithm TS, the prior algorithms SHE, HE, and XTD with the OPERA 1 channel model and AWGN and a lower bound for B-PSK transmissions, in accordance with the present invention.
Figure 7:
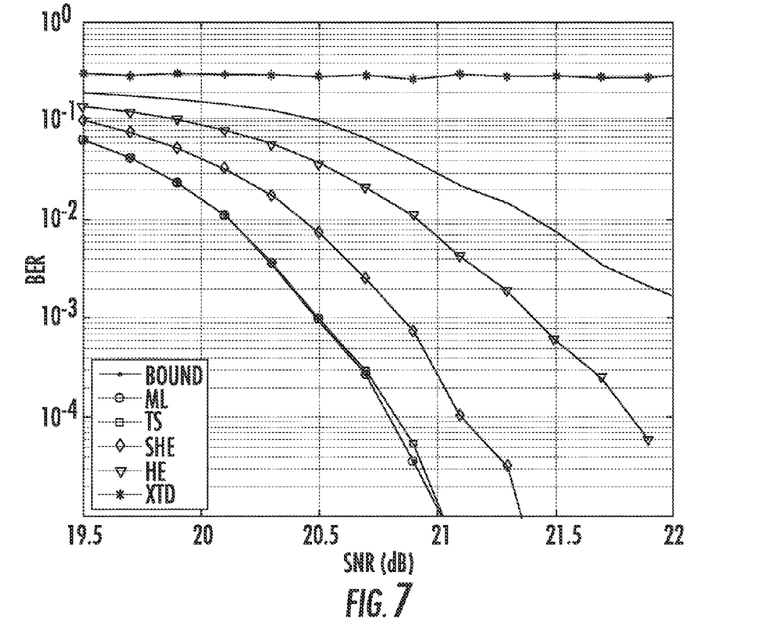
FIG. 7 compares the BER performances vs. SNR for a 1024-QAM modulation using the ML algorithm, the algorithm TS, the prior algorithms SHE, HE, and XTD with the OPERA 1 channel model and AWGN and a lower bound for 1024-QAM transmissions, in accordance with the present invention.

FIG. 6 and FIG. 7 depict the BER obtained for different SNRs when the B-PSK and 1024-QAM, respectively, are adopted. In particular, FIG. 6 shows that the ML and TS solutions almost overlap the bound.

Considering a BER of $10^{-3}$, a gain of about 0.6 dB and of more than 1.5 dB is present compared to the SHE and the HE estimators, respectively. The poor performance of the XTD proves the sensibility of this algorithm to the SPO changes. On the other hand, when the SPO is constant from packet to packet, the XTD is comparable to the system performance bound, as shown in [1].

Similar results are illustrated in FIG. 7, where the bound, the ML and the TS are almost coincident, and they gain almost 0.4 dB and 0.9 dB compared to the SHE and the HE estimators, respectively, at a BER=$10^{-3}$. at a. The detrimental effects of the SPO on the XTD are even more evident for the 1024-QAM modulation, which is less robust to phase rotations. It has to be noticed that the ML and the TS estimators achieve the same performance, but their computational load is very different. In particular, the B-PSK modulation requires that the differences among the synchronization offsets be estimated with a resolution of at least $10^{-2}$. Furthermore, the employed frame synchronization algorithm guarantees that the differences among the synchronization offsets are within the interval [−20,20] for all the SNRs of interest. Therefore, the number of iterations, T, of the ML is equal to $40/10^{-2} = 4 \cdot 10^3$, while U is 100. Referring to Table 1, about $8 \cdot 10^5$ additions and more than $1.2 \cdot 10^6$ multiplications are required for the ML. In the same conditions, the TS requires only about $9 \cdot 10^3$ additions and $1.3 \cdot 10^3$ multiplications.

The invention claimed is:

1. A method of estimating transmission channel response and differences of synchronization offsets in a received stream of packets of OFDM data transmitted on a transmission channel, the stream of OFDM data being preceded by a header of symbols, the method comprising:

performing, using a processor, a data-aided estimation of a channel response using the header when a packet is received, to thereby generate a corresponding estimated channel response value $\hat{H}_p(k)$ for each sub-carrier (k) used in OFDM modulation;

for a first received packet, storing the estimated channel response $\hat{H}_f(k)$ as a refined channel response $\overline{H}_f(k)$ for each of the sub-carriers (k), using the processor;

for successive packets, using the processor to iteratively calculate a phase difference $\alpha_{p,p-1}(k)$ between the estimated channel response $\hat{H}_p(k)$ for a current packet (p) and a refined channel response for a previous packet $\overline{H}_{p-1}(k)$ for each of the sub-carriers (k), estimate values of differences of synchronization offsets $\tau_f(k)$ for each phase difference $\alpha_{p,p-1}(k)$ for each of the sub-carriers (k), choose a set of quantized values for each difference of synchronization offsets, choose, in the set of quantized values, a coarse estimation of the difference of synchronization offsets ($\tau'_{p,p-1}$) for the current packet as a quantized value that maximizes a histogram of synchronization offsets $\tau_f(k)$ versus quantized values, process values of a neighborhood of the coarse estimation ($\tau'_{p,p-1}$) with an algorithm configured to calculate a refined difference of synchronization offsets for the current packet as a value that minimizes a sum of the Euclidean distances, for frequencies of the sub-carriers, between the estimated channel response $\hat{H}_p(k)$ and the refined channel response $\overline{H}_{p-1}(k)$ rotated in a complex plane by a phase offset proportional to the refined difference of synchronization offsets, and calculate the refined channel response for the current packet $\overline{H}_p(k)$ for each of the carriers (k) as a weighted average of a number p of received packets, of a rotated replica of the refined channel response $\overline{H}_{p-1}(k)$ multiplied by p−1 and the estimated channel response $\hat{H}_p(k)$.

2. The method of claim 1, wherein the algorithm comprises an iterative search algorithm using, as a seed, the coarse estimation ($\tau'_{p,p-1}$).

3. The method of claim 1, wherein the algorithm is based on a quadratic Taylor's series approximation of the sum of Euclidean distances in the neighborhood of the coarse estimation ($\tau'_{p,p-1}$).

4. The method of claim 1, wherein a bin size of the histogram is pre-established.

5. The method of claim 1, wherein a bin size of the histogram is determined by at least:
determining the histogram bin size as a value that maximizes a probability that a distance between a difference of synchronization offset from the coarse estimation be smaller than a maximum error of the coarse estimation.

6. The method of claim 5, wherein the maximum error of the coarse estimation is determined by at least:
determining a mean square error of the refined estimation for which the system achieves a performance;
determining the maximum error of the coarse estimation as the value that results in mean square error.

7. A method of estimating transmission channel response and differences of synchronization offsets in a received stream of packets of OFDM data transmitted on a transmission channel, the stream of OFDM data being preceded by a header of symbols, the method comprising:
performing, using a processor, a data-aided estimation of a channel response using the header when a packet is received, to thereby generate a corresponding estimated channel response value for each sub-carrier used in OFDM modulation;
for a first received packet, storing the estimated channel response as a refined channel response for each of the sub-carriers, using the processor;
for successive packets, using the processor to iteratively
calculate a phase difference between the estimated channel response for a current packet and a refined channel response for a previous packet for each of the sub-carriers,
estimate values of differences of synchronization offsets for each phase difference for each of the sub-carriers,
choose a set of quantized values for each difference of synchronization offsets,
choose, in the set of quantized values, a coarse estimation of the difference of synchronization offsets for the current packet as a quantized value for a histogram of synchronization offsets versus quantized values,
process values of a neighborhood of the coarse estimation with an algorithm configured to calculate a refined difference of synchronization offsets for the current packet as a value for a sum of the Euclidean distances, for frequencies of the sub-carriers, between the estimated channel response and the refined channel response rotated in a complex plane by a phase offset based upon the refined difference of synchronization offsets, and
calculate the refined channel response for the current packet for each of the carriers as a weighted average of a number p of received packets, of a rotated replica of the refined channel response multiplied by p−1 and the estimated channel response.

8. The method of claim 7, wherein the algorithm comprises an iterative search algorithm using, as a seed, the coarse estimation.

9. The method of claim 7, wherein the algorithm is based on a quadratic Taylor's series approximation of the sum of Euclidean distances in the neighborhood of the coarse estimation.

10. An OFDM receiver comprising:
a sampling circuit configured to sample an incoming signal received through a transmission channel;
an estimation circuit configured to receive samples of the incoming signal and to estimate transmission channel response and eventual differences of synchronization offsets introduced at a receiver side by at least:
performing a data-aided estimation of a channel response using the header when a packet is received, to thereby generate a corresponding estimated channel response value for each sub-carrier used in OFDM modulation;
for a first received packet, storing the estimated channel response as a refined channel response for each of the sub-carriers,
for successive packets, iteratively
calculating a phase difference between the estimated channel response for a current packet and a refined channel response for a previous packet for each of the sub-carriers,
estimating values of differences of synchronization offsets for each phase difference for each of the sub-carriers,
choosing a set of quantized values for each difference of synchronization offsets,
choosing, in the set of quantized values, a coarse estimation of the difference of synchronization offsets for the current packet as a quantized value for a histogram of synchronization offsets versus quantized values,
processing values of a neighborhood of the coarse estimation with an algorithm configured to calculate a refined difference of synchronization offsets for the current packet as a value for a sum of the Euclidean distances, for frequencies of the sub-carriers, between the estimated channel response and the refined channel response rotated in a plane by a phase offset based upon the refined difference of synchronization offsets, and
calculating the refined channel response for the current packet for each of the carriers as a weighted average of a number p of received packets, of a rotated replica of the refined channel response multiplied by p−1 and the estimated channel response.

11. The OFDM receiver of claim 10, further comprising an equalizer coupled to the estimation circuit and configured to compensate an effect of the transmission channel response and of the differences of synchronization offsets on the received samples and to generate equalized samples.

12. The OFDM receiver of claim 11, further comprising an OFDM detector configured to generate a stream of demodulated digital symbols based upon the equalized samples.

13. The OFDM receiver of claim 10, wherein the algorithm comprises an iterative search algorithm using, as a seed, the coarse estimation.

14. The OFDM receiver of claim 10, wherein the algorithm is based on a quadratic Taylor's series approximation of the sum of Euclidean distances in the neighborhood of the coarse estimation.

15. The OFDM receiver of claim 10, wherein a bin size of the histogram is pre-established.

16. The OFDM receiver of claim 10, wherein a bin size of the histogram is determined by at least:
  determining the histogram bin size as a value that maximizes a probability that a distance between a difference of synchronization offset from the coarse estimation be smaller than a maximum error of the coarse estimation.

17. The OFDM receiver of claim 16, wherein the maximum error of the coarse estimation is determined by at least:
  determining a mean square error of the refined estimation for which the system achieves a performance;
  determining the maximum error of the coarse estimation as the value that results in mean square error.

18. A non-transitory computer readable medium storing executable instructions that, when executed, cause a processor to estimate transmission channel response and differences of synchronization offsets introduced in a received stream of packets of OFDM data transmitted on a transmission channel, the stream of OFDM data being preceded by a header of symbols, by at least:
  performing a data-aided estimation of a channel response using the header when a packet is received, to thereby generate a corresponding estimated channel response value for each sub-carrier used in OFDM modulation;
  for a first received packet, storing the estimated channel response as a refined channel response for each of the sub-carriers;
  for successive packets, iteratively
    calculating a phase difference between the estimated channel response for a current packet and a refined channel response for a previous packet for each of the sub-carriers,
    estimating values of differences of synchronization offsets for each phase difference for each of the sub-carriers,
    choosing a set of quantized values for each difference of synchronization offsets,
    choosing, in the set of quantized values, a coarse estimation of the difference of synchronization offsets for the current packet as a quantized value for a histogram of synchronization offsets versus quantized values,
    processing values of a neighborhood of the coarse estimation with an algorithm configured to calculate a refined difference of synchronization offsets for the current packet as a value for a sum of the Euclidean distances, for frequencies of the sub-carriers, between the estimated channel response and the refined channel response rotated in a complex plane by a phase offset based upon the refined difference of synchronization offsets, and
    calculating the refined channel response for the current packet for each of the carriers as a weighted average of a number p of received packets, of a rotated replica of the refined channel response multiplied by p−1 and the estimated channel response.

19. The non-transitory computer readable medium of claim 18, wherein the algorithm comprises an iterative search algorithm using, as a seed, the coarse estimation.

20. The non-transitory computer readable medium of claim 18, wherein the algorithm is based on a quadratic Taylor's series approximation of the sum of Euclidean distances in the neighborhood of the coarse estimation.

21. The non-transitory computer readable medium of claim 18, wherein a bin size of the histogram is pre-established.

22. The non-transitory computer readable medium of claim 18, wherein a bin size of the histogram is determined by at least:
  determining the histogram bin size as a value that maximizes a probability that a distance between a difference of synchronization offset from the coarse estimation be smaller than a maximum error of the coarse estimation.

23. The non-transitory computer readable medium of claim 22, wherein the maximum error of the coarse estimation is determined by at least:
  determining a mean square error of the refined estimation for which the system achieves a performance;
  determining the maximum error of the coarse estimation as the value that results in mean square error.

* * * * *